April 2, 1963   H. A. MALE   3,083,616
GEAR CUTTING MACHINE WITH CHAMFERING MEANS
Filed Aug. 17, 1961   2 Sheets-Sheet 1

INVENTOR.
HERMAN A. MALE
BY *Richard W Treverton*

April 2, 1963      H. A. MALE      3,083,616

GEAR CUTTING MACHINE WITH CHAMFERING MEANS

Filed Aug. 17, 1961      2 Sheets-Sheet 2

United States Patent Office 3,083,616
Patented Apr. 2, 1963

3,083,616
GEAR CUTTING MACHINE WITH CHAMFERING MEANS
Herman A. Male, Rochester, N.Y., assignor to The Gleason Works, Rochester, N.Y., a corporation of New York
Filed Aug. 17, 1961, Ser. No. 132,070
7 Claims. (Cl. 90—1.4)

The present invention relates to machines for cutting gears, especially spiral bevel and hypoid gears, and has particular relation to means provided on the machines for chamfering the gear teeth.

It is desirable to chamfer gears on the tooth cutting machine in order to save the time and labor of chucking them on a separate chamfering machine, and in order to utilize the gear indexing mechanism of the cutting machine to bring the gear teeth successively to the chamfering tool. However, this arrangement imposes serious space limitations and adjustment problems due to the practical necessity of having the chamfering tool act on the gear tooth immediately following the tooth cutting station. Because of these limitations and problems, prior chamfering devices of any given design have been unsuitable for gears of many designs within the tooth-cutting range of the machines. The primary object of the present invention is a machine having a compact and universally adjustable chamfering means capable of substantially extending the range of gear designs that may be accommodated.

A machine according to the invention has a work head supporting a work spindle and a chamfering device, said device comprising a support mounted on the head, a cylinder unit having a piston reciprocable in the cylinder chamber thereof, the piston being adapted to carry a tool for chamfering a gear mounted on the spindle, the cylinder unit having an outer spherical surface received in a substantially spherical recess in the support, and means for securing the cylinder unit to the support in different positions about the sphere center of said spherical surface.

A preferred embodiment of the invention is shown in the accompanying drawings, wherein.

Figure 1:
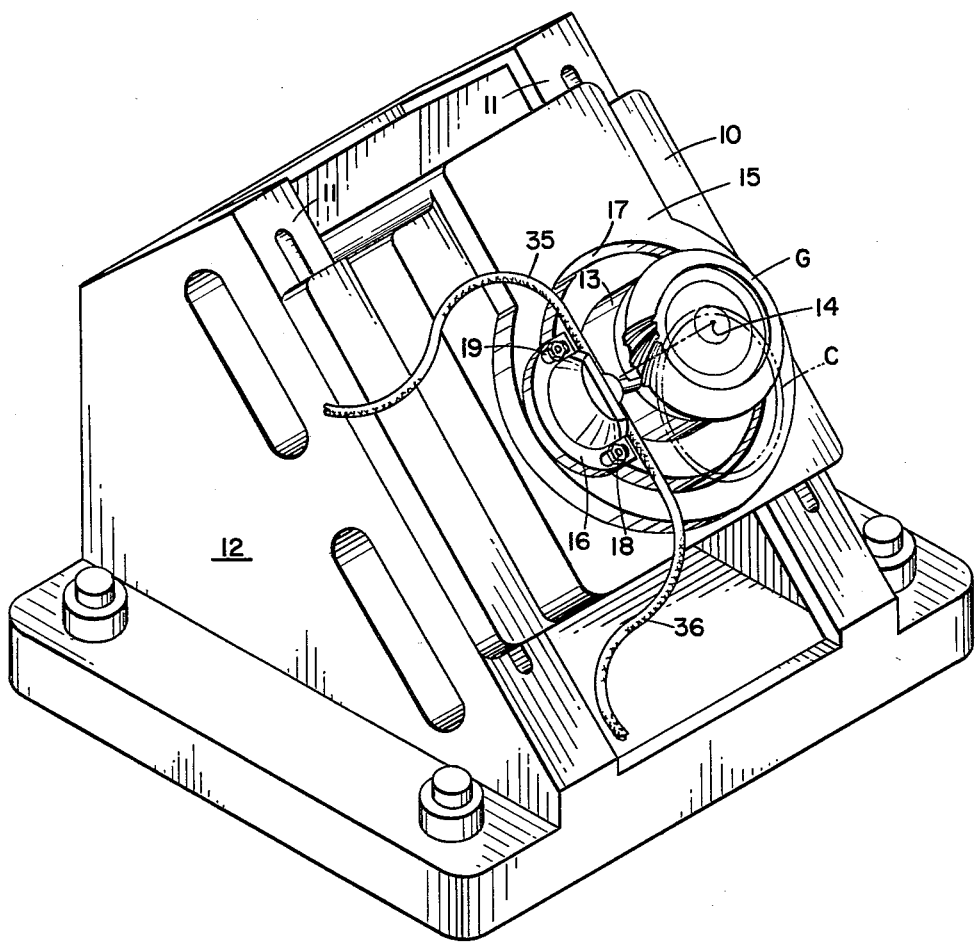
FIG. 1 is an isometric view of the work head of the gear cutting machine, with the chamfering device thereon.

The work head 10, FIG. 1, is substantially like that of the gear cutting machine disclosed in application Serial No. 87,315 filed February 6, 1961, by H. A. Male. The head is adjustable upon ways 11 of an inclined column 12 mounted on the frame of the machine (not shown), to bring a work gear G into position for cutting of the tooth slots thereof by a circular face mill cutter, shown in phantom at C, which is rotatable on a cutter head mounted adjustably on the machine frame. The gear is chucked on a work spindle 13 whose axis 14 is perpendicular to the plane front face 15 of the work head upon which the support 16 of the chamfering device is mounted.

Opening from this face 15 of the work head there is a circular T-slot 17 concentric with spindle axis 14. The support 16 is secured by fasteners 18 which are held in the T-slot and extend through a pair of parallel elongated openings 19 in the support. The elongation of the openings is in a direction which enables the support to be adjusted on face 15 in directions radial of axis 14 when the T-slot fasteners 18 have been loosened. At the same time the support and fasteners may be adjusted along the T-slot around the same axis.

The support 16 has a recess 21 of spherical, or, more accurately, hemispherical, form. Received in this recess is a cylinder unit having a complementary spherical surface 22, the unit comprising sections 23 and 24 secured together by screws 25. The sphere center, 26, lies within the cylinder chamber 27 of the cylinder unit, along the cylinder axis 28 of the chamber. A gib ring 29 has a continuation 31 of the internal spherical surface 21 for clamping engagement with the mating external spherical surface 22. The gib is drawn against the support 16 by screws 32 to clamp the cylinder unit, and, upon loosening of these screws, the cylinder unit may be adjusted universally about center 26 through a substantial angle.

Figure 2:
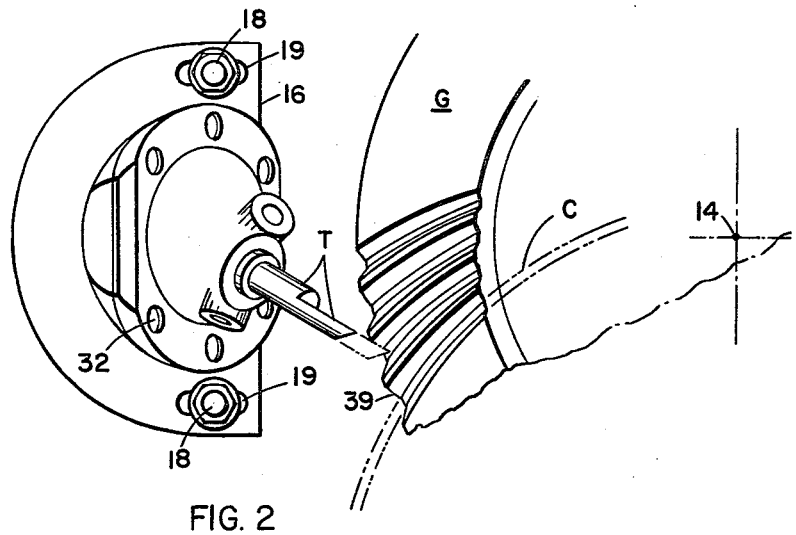
FIG. 2 is a view of the chamfering device and a work gear in a plane perpendicular to the axis of the gear.

A piston 33 reciprocable in the cylinder chamber 27 carries the chamfering tool, T, which is detachably secured thereto by one or more set screws 34. Hydraulic pressure is alternately applied to the opposite ends of the cylinder chamber to reciprocate the piston and tool. Such pressure is applied through flexible conduits 35 and 36 which are connected to the cylinder unit and extend to the hydraulic system of the machine, being controlled by a reversing valve (not shown) which operates in time with the indexing mechanism for spindle 13. Conduit 35 opens through port 37 into the outer end of the cylinder chamber and conduit 36 opens through port 38 into the inner end of the chamber. Throughout most of the operating cycle of the machine the reversing valve connects conduit 35 to pressure and conduit 36 to exhaust, so that the piston 33 and tool T are retracted. At the conclusion of each work spindle indexing operation, which advances the gear G by one pitch following each tooth slot cutting operation of the machine, the valve is momentarily reversed to cause a cutting stroke of the piston, moving the tool from its retracted position shown in full lines in FIGS. 2 and 3 to its advanced position shown in broken lines.

Figure 3:
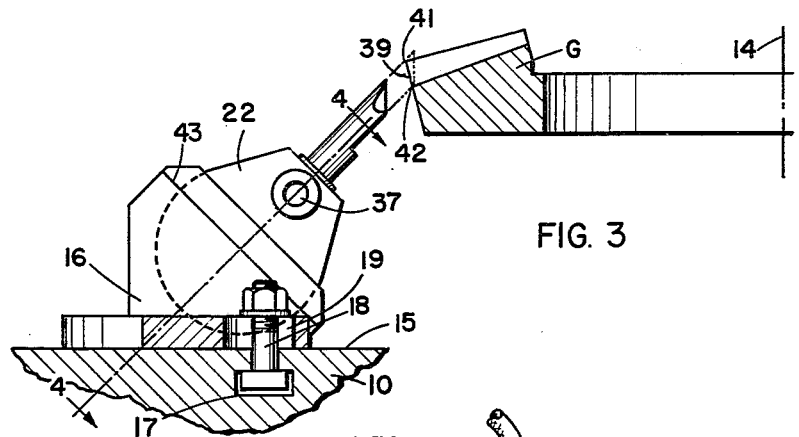
FIG. 3 is a view, partly in section, in planes approximately perpendicular to FIG. 2.
Figure 4:
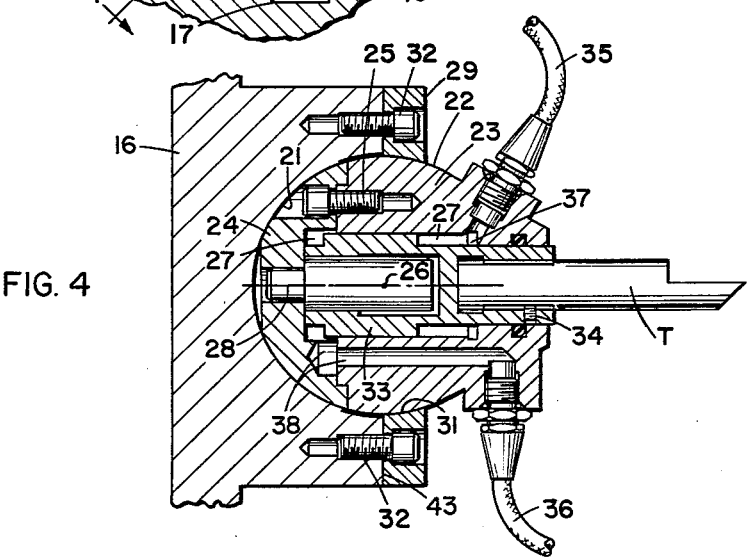
FIG. 4 is a sectional view, in plane 4—4 of FIG. 3.

Preferably the tool is so shaped and positioned that during the latter portion of its cutting stroke it progressively chamfers the tooth edge 39 from top corner 41 to the bottom 42, this resulting in an easier and smoother cutting action than if the tool is arranged to cut simultaneously along the entire edge 39. As shown in FIG. 3 the tool is adapted to cut in a direction to chamfer the bottom of the tooth slot at 42 as well as the edge 39. For this purpose the plane face 43 of support 16, on which the gib 29 seats, is preferably inclined to plane face 15 at an acute angle, this angle being forty-five degrees in the illustrated embodiment. The direction of radial adjustment of the support 16, i.e. the direction of elongation of slots 19, is perpendicular to the line of intersection of the planes of faces 43 and 15.

Having now described the preferred embodiment of my invention, and its operation, what I claim is:

1. A machine for cutting gear teeth and the like having a work head supporting a work spindle and a chamfering device, said device comprising a support mounted on the head, a cylinder unit having a piston reciprocable in the cylinder chamber thereof, the piston being adapted to carry a tool for chamfering a gear mounted on the spindle, the cylinder unit having an outer spherical surface received in a substantially spherical recess in the support, and means for securing the cylinder unit to the support in different positions about the sphere center of said spherical surface.

2. A machine according to claim 1 in which said sphere center is with the cylinder chamber.

3. A machine according to claim 2 in which the axis of the cylinder chamber intersects said sphere center.

4. A machine according to claim 2 in which the support is adjustable on the work head radially of and angularly about the axis of the work spindle.

5. A machine according to claim 4 in which the work head has a plane face perpendicular to the axis of the work spindle for seating the support and a circular T-slot in said face concentric with said axis, and the support has elongated openings for fasteners which extend into the T-slot for securing the support to the head, said openings in the support being elongated in a direction which enables adjustment of the support on the head substantially radially of the spindle.

6. A machine according to claim 2 in which the support has a plane face disposed at an acute angle to said face of the work head, and said means for securing the cylinder unit comprises a gib releasably secured to said plane face of the support and having a surface substantially complementary to the spherical surface of the cylinder unit and adapted for clamping engagement therewith.

7. A machine for cutting gear teeth and the like having a work head supporting a work spindle and having a plane face perpendicular to the axis of the spindle, there being a circular T-slot in said face concentric with said axis, a chamfering device comprising a support seating on said face and having elongated openings for fasteners which extend into the T-slot for securing the support to the head in different positions around said axis, said openings being elongated in a direction which enables adjustment of the support on the head radially of said axis, a cylinder unit having a piston reciprocable in the cylinder chamber thereof, the piston being adapted to carry a tool for chamfering a gear mounted on the spindle, the cylinder unit having an outer spherical surface received in a substantially spherical recess in the support, the support having a plane face whose plane intersects the plane of said face of the works head at an acute angle, with the line of such intersection approximately at right angles to the direction of elongation of the slots, and a gib releasably secured against said plane face of the support for clamp engagement against the spherical surface of the cylinder unit.

No references cited.